Patented Sept. 18, 1934

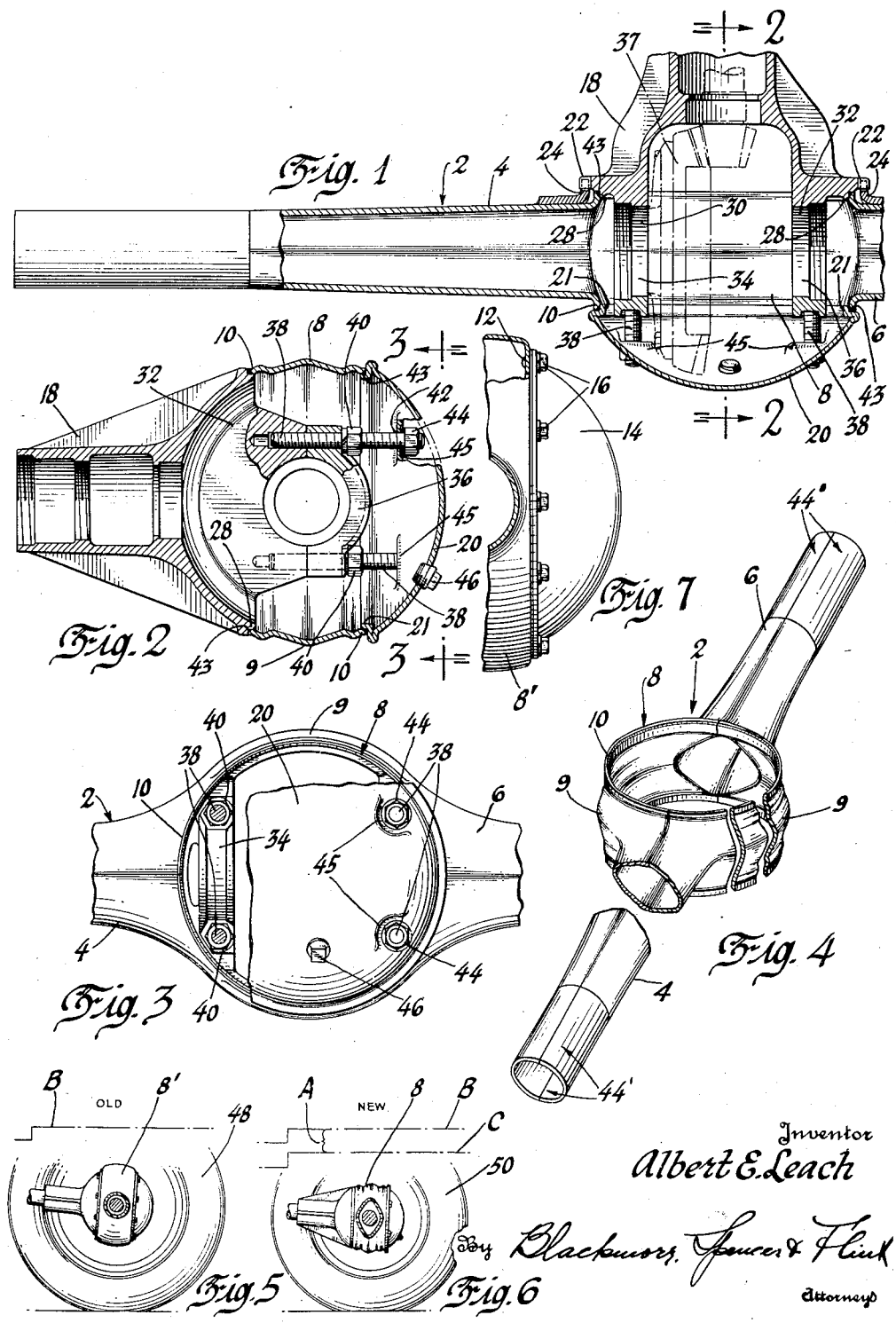

1,973,905

UNITED STATES PATENT OFFICE 1,973,905

AXLE HOUSING

Albert E. Leach, Royal Oak, Mich., assignor to General Motors Corporation, Detroit, Mich., a corporation of Delaware Application April 14, 1933, Serial No. 666,084

1 Claim. (Cl. 74—607)

This invention relates to automotive vehicles and has particular reference to improvements in the rear axle and the interrelation of the rear axle carrier and the cover plate for the differential housing.

In prior constructions the differential housing of banjo axles has been very large which limited the extent to which the vehicle could be built close to the ground because of the clearance required between the road and the bottom of the differential housing. In the course of experiments made with a view to bringing the vehicle closer to the ground it was discovered that by providing the differential housing (or the enlarged central portion of the axle) with a depression entirely around its periphery so as to bring the housing very closely around the ring gear, and by eliminating the usual flanges on the housing, that a much smaller differential housing would be obtained and thereby permit the vehicle to be built closer to the ground.

In eliminating the usual inwardly directed flanges on the housing, which flanges were used to secure the rear cover in the axle carrier, the present invention eliminates the relatively large number of machine screws which it has been necessary to use to screw the cover over the opening in the housing. In removing the flanges, however, the differential housing was weakened and to compensate for this weakness the rear axle carrier on the front side of the axle and the cover on the rear side are closely fitted in the housing openings and thereby reinforcing the edges of the openings so that the housing and axle are as strong as, or stronger than prior constructions. In the present invention the rear axle carrier is provided with a pair of bridges, each of which has bolted thereto a cap to form bearings for the ball races for the moving parts such as the differential housing. The bolts which secure the caps to the bridges of the rear axle carrier project rearwardly beyond or through the opening in the rear axle housing and are used to fasten the cover plate in position.

On the drawing

Figure 1 is a plan view, mostly in section, through the rear axle of the invention, the view also showing the rear axle carrier in section.

Figure 2 is a sectional view on the line 2—2 of Figure 1.

Figure 3 is an end elevation on the line 3—3 of Figure 2 with parts broken away better to illustrate certain parts of the invention.

Figure 4 is a perspective view of the axle.

Figures 5 and 6 show the old and new forms of housing and indicate diagrammatically the manner in which the vehicle may be built lower.

Figure 7 shows the old structure and illustrates, in connection with Figure 3, the comparative size of the structure of the present invention.

Referring to the drawing, the numeral 2 indicates as a whole the rear dead axle of an automotive vehicle. The axle is of the banjo type and comprises the two elongated tubular end portions 4 and 6 to receive the usual live driving axle and the central enlarged differential housing 8. In comparison with and in contrast to prior constructions, the central housing 8 is depressed around its entire periphery and has its edges, where it forms the opening to the banjo, straight and unflanged as indicated at 10. The sides of the housing are also substantially flat except for a strengthening rib or bead 9. By removing the flange and leaving the edges of the openings straight as indicated at 10 and depressing the periphery of the housing 8, the housing portion for the vehicle is made much smaller as is obvious by a comparison of Figure 2 with Figure 7, the latter showing the old structure. By referring to Figure 7 it will be seen that the housing 8' of prior constructions is much larger than the housing 8. The housing 8', it will be noted, is provided with flanges 12 at both sides which flanges are used to fasten to the housing the usual cover plate 14 and the usual torque tube or the carrier. The fastening of the cover plate necessitates the plurality of machine bolts 16 while in the present invention the flange 12 as well as the machine bolts 16 and threaded openings are eliminated as will be apparent from the description and drawing.

At the inner or front side of the axle housing 8 there is mounted the rear axle carrier 18 having an annular shoulder or flange 28 accurately and tightly fitting in the front opening of the housing, while at the outer or rear side there is positioned and secured the cover plate 20 having an annular shoulder or flange 21 accurately and tightly fitting in the rear opening of the housing. The cover plate 20 is heavier than in conventional designs and pilots in the rearwardly facing opening as is shown in Figures 1 and 2 and confines the usual gasket 43 between the plate and housing. The rear axle carrier 18 fits into the forwardly facing lateral opening of the housing 8 as shown in Figures 1 and 2, and has the spaced lugs 22 at its sides to fit over the fingers 24 secured to the arms 4 such as by welding. Both the cover plate 20 and the carrier 18 reinforce and strengthen the differential housing 8 and axle 2. The lugs 22 and fingers 24 position the carrier. The carrier flange 28, which fits in the forwardly directed opening of the housing, and a gasket 43 form a tight connection.

The carrier 18 has the bridge portions 30 and 32 over which there are secured the caps 34 and 36. The caps 34 and 36 together with the bridge portions 30 and 32 form bearings for the reception of the ball races which support the differential housing and the ring gear 37. The caps 34 and 36 are secured to the bridges 30 and 32 by means of the bolts or screw threaded shanks 38 which pass through openings in the caps and are secured into the bridges. Suitable nuts 40 are turned onto the threaded shanks to hold the caps in place.

The shanks 38 project rearwardly through the rear opening in the axle housing and extend through openings 42 in the cap 20. Nuts 44 threaded onto the shanks 38 hold the cap 20 in place. The openings 42 are positioned in countersunk or specially shaped portions 45 of the cap 20.

The axle 2 may be formed by shaping two symmetrical halves and bringing them together along the line indicated by the numeral 44' and flash welding the two together to form the completed axle housing. This structure is best shown in Figure 4.

The usual plug 46 is screw threaded into an opening in the plate 20 to allow for the application of lubricant.

Referring to Figures 5 and 6, attention is called to the old structure shown in Figure 5 in which the differential housing 8' is shown as limiting the distance to which the vehicle may be built close to the ground. With a differential housing of the type used in Figure 5, a wheel and tire 48 are required which have a much larger outer periphery than the wheel and tire 50 of Figure 6. Attention is called to the fact that for the same ground clearance in the two figures, the new structure of the present invention in Figure 6 has a much smaller differential housing and allows the vehicle to be built closer to the ground by the distance represented by A between the horizontal lines B and C of the figure. The horizontal line B indicates the bottom of the rear seat pan in the old structure and the horizontal line C indicates the bottom of the rear seat pan in the new structure.

The decrease in the overall extent or diameter of the differential housing is comparatively illustrated in Figures 5 and 6 and in Figures 2 and 7.

I claim:

A dead axle construction for motor vehicles comprising a differential carrier; a tubular housing having an enlarged ring-shaped central portion forming an unflanged band with an internal diameter closely approximating the diameter of a differential ring gear to be received therein; a cover plate; and bolts anchored in threaded passages in said carrier and extending through openings in said plate for clamping said differential carrier and cover plate against the opopsed faces of the unflanged band of said tubular housing.

ALBERT E. LEACH.